Patented May 8, 1945

2,375,629

UNITED STATES PATENT OFFICE 2,375,629

ESTER OF ALPHA-HYDROXY ISOBUTYRIC ACID

Gaetano F. D'Alelio, Northampton, and James W. Underwood, Pittsfield, Mass., assignors to General Electric Company, a corporation of New York No Drawing. Original application February 1, 1940, Serial No. 316,816. Divided and this application March 30, 1944, Serial No. 528,678

3 Claims. (Cl. 260—484)

This application is a division of our copending application Serial No. 316,816, filed February 1, 1940, and assigned to the same assignee as the present invention.

This invention relates to the production of the new chemical compound, 2-nitro-isobutyl alpha-hydroxy isobutyrate. This compound, which also may be named 2-nitro-2-methylpropyl alpha-hydroxy isobutyrate, has the following formula:

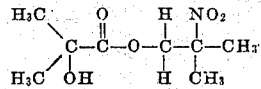

Example 1

1 mol alpha-hydroxy isobutyric acid
1.22 mol 2-nitro-isobutanol (2-nitro-2-methyl-1-propanol)
Benzene in an amount equal to twice the volume of the alpha-hydroxy isobutyric acid and 2-nitro-isobutanol
Concentrated sulfuric acid (esterification catalyst) in an amount equal to 2% by weight of the alpha-hydroxy isobutyric acid were mixed and refluxed for eight hours in a Dean and Stark apparatus for the continuous removal of water of esterification. The esterification product was neutralized by mixing with anhydrous sodium carbonate and then distilling the neutralized mass. The solvent (benzene) was distilled off at atmospheric pressure and the excess alcohol at 60° to 100° C. under 2 mm. pressure. The 2-nitro-isobutanol ester of alpha-hydroxy isobutyric acid distilled at 111° to 115° C. at 2 mm. pressure.

The following example illustrates the utilization of the 2-nitro-isobutyl alpha-hydroxy isobutyrate (2-nitro-2-methylpropyl alpha-hydroxy isobutyrate) of Example 1 in the production of 2-nitro-isobutyl methacrylate (2-nitro-2-methylpropyl methacrylate), which has the following formula:

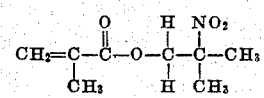

Example 2

The 2-nitro-isobutyl alpha-hydroxy isobutyrate of Example 1 was dehydrated with P₂O₅ by adding 1 mol of the ester to 1 mol P₂O₅ suspended in sufficient benzene so that the mixture could be easily stirred. Hydroquinone (polymerization inhibitor) was added to the mass in an amount equal to 1% by weight of the ester. The mixture was continuously stirred, the reaction being allowed to proceed at room temperature for 1½ hours, and then was brought slowly to the refluxing (boiling) temperature of the mass over a period of 1 hour. It was held just below boiling temperature for 1 hour, thereafter being refluxed for 3 hours. After filtering the reaction mass, the benzene was distilled off at atmospheric pressure and a crude distillate of 2-nitro-isobutyl methacrylate boiling at 85° to 105° C. at 3 mm. pressure was obtained. The impure ester was washed with a 1% sodium hydroxide solution to remove any inhibitor and decomposition products, followed by washing with hydrochloric acid and thereafter with water. The washed ester was dried over anhydrous sodium carbonate and then redistilled, yielding the purified ester, 2-nitro-isobutyl methacrylate boiling at 65° to 70° C. at 0.5 mm. pressure.

A sample of the 2-nitro-isobutyl methacrylate prepared as described above polymerized, without added catalyst, after heating for 5 days at 50° C. to a soft, rubbery, colorless mass. Upon prolonged heating, it was converted into a hard mass. With 0.1% by weight benzoyl peroxide the above ester polymerized to a hard, colorless mass in 27 hours.

What we claim as new and desire to secure by Letters Patent of the United States is:

1. The compound having the following formula:

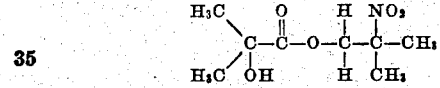

2. The process of preparing 2-nitro-2-methylpropyl alpha-hydroxy isobutyrate which comprises effecting reaction between alpha-hydroxy isobutyric acid and 2-nitro-2-methyl-1-propanol.

3. The processs of preparing 2-nitro-2-methylpropyl alpha-hydroxy isobutyrate which comprises effecting reaction between alpha-hydroxy isobutyric acid and 2-nitro-2-methyl-1-propanol in benzene solution and while admixed with a small amount of concentrated sulfuric acid as an esterification catalyst, neutralizing the reaction mass and separating 2-nitro-2-methylpropyl alpha-hyodroxy isobutyrate from the neutralized reaction mass by distillation.

GAETANO F. D'ALELIO.
JAMES W. UNDERWOOD.